United States Patent [19]
Freye et al.

[11] 3,722,398
[45] Mar. 27, 1973

[54] APPARATUS FOR PRODUCING CEREAL BISCUITS

[75] Inventors: James D. Freye, Cary; Jeffrey G. Poat, Schaumburg, both of Ill.

[73] Assignee: The Quaker Oats Company, Chicago, Ill.

[22] Filed: Feb. 22, 1971

[21] Appl. No.: 117,292

[52] U.S. Cl. ............... 425/204, 425/209, 425/351, 425/422
[51] Int. Cl. .................... A23b 9/00, A23l 1/10
[58] Field of Search .......... 99/80, 81, 83, 237, 237 R, 99/237 F; 25/100; 18/4 R, 4 C, 4 P, 4 V, 5 A, 5 R; 107/8 C, 8 FA, 4 R, 4 A, 27 R, 27 A, 57 R, 57 A, 57 D, 68–70, 14 R; 17/32; 31/35–39

[56] References Cited

UNITED STATES PATENTS

| | | | |
|---|---|---|---|
| 3,241,178 | 3/1966 | Bridge | 17/32 |
| 3,490,093 | 1/1970 | Mallas et al. | 17/32 |
| 1,399,873 | 12/1921 | Powell | 107/68 |
| 2,158,910 | 5/1939 | Pellar | 102/27 R X |
| 3,347,176 | 10/1967 | Hall | 17/32 X |

Primary Examiner—James R. Boler
Assistant Examiner—G. V. Larkin
Attorney—Milton C. Hansen and Donnie Rudd

[57] ABSTRACT

An apparatus is disclosed for producing cereal biscuits or the like. The apparatus includes an endless conveyor comprised of a plurality of equal sized plates having openings from top to bottom thereof and which move over a platform thus forming open top containers with means included for filling the thus formed open top containers, compressing the filling therein, and removing the compressed mixture from the openings.

1 Claim, 4 Drawing Figures

INVENTORS:
JAMES D. FREYE
JEFFREY G. POAT

BY Donnie Rudd
ATTORNEY

INVENTORS:
JAMES D. FREYE
JEFFREY G. POAT

BY

ATTORNEY

APPARATUS FOR PRODUCING CEREAL BISCUITS

BACKGROUND OF THE INVENTION

1. FIELD OF THE INVENTION

This invention relates to an apparatus for the production of a compressed cereal biscuit or the like.

2. DESCRIPTION OF THE PRIOR ART

With the exception of shredded wheat biscuits there is not presently a cereal biscuit on the market. There are machines, of course, to produce the well-known shredded wheat biscuit. These machines, however, are not operable in forming a non-shredded product such as one composed of small subdivided particles which are held together by some type of binding material. There are also many types of machines for forming ground food products, but likewise these machines are not easily adaptable to the needs discussed above. There is, therefore, a need for an apparatus for producing a ready-to-eat cereal biscuit wherein the apparatus utilizes continuous production in as nearly an automated state as possible.

SUMMARY OF THE INVENTION

It is an object of this invention to produce an apparatus for producing a ready-to-eat cereal biscuit or the like.

It is another object of this invention to produce an apparatus for producing a ready-to-eat cereal biscuit or the like wherein said apparatus is as fully automated as possible.

The objects of this invention are accomplished by an apparatus for producing a cereal biscuit or the like, said apparatus comprising: an endless conveyor, said endless conveyor comprising a plurality of substantially equal sized plates, said equal sized plates each having a plurality of juxtaposed openings extending from top to bottom through the equal sized plates, said juxtaposed openings forming a sequence of openings on the endless conveyor; a platform, said platform being underneath a portion of the endless conveyor and contacting the equal sized plates to form a plurality of open top containers; means for moving the endless conveyor over the platform; means for filling the open top containers with a mixture of cereal particles and binder; means for compressing a mixture of cereal particles and binder in the open top containers; means for removing a compressed mixture from an opening, said means for removing a compressed mixture from an opening being above said endless conveyor past the point at which the endless conveyor leaves the platform; and means for conveying compressed cereal biscuits away from the endless conveyor.

The objects of this invention are more fully accomplished by an apparatus such as the one discussed above and wherein; the means for filling the open top containers with a mixture of cereal particles and binder comprises an open trough bounded on its lower side by the endless conveyor and having a plurality of movable times therein; the means for compressing a mixture of cereal particles and binder in the open top containers comprises a plurality of plungers having a cross section substantially the same as that of the open top container and includes means for moving the plurality of plungers into the open top containers; and wherein the means for removing a compressed mixture from an opening comprises a plurality of plungers with means for moving the plurality of plungers through the juxtaposed openings.

More simply described the apparatus of this invention comprises a plurality of plates each substantially the same size and each connected together in the form in a continuous endless conveyor with each of the plates having a plurality of openings therein. The openings in the plates are so located that they form lines of holes when the plates move along in the connected and operable arrangement. The plates move over a platform which causes the bottom openings to be closed and forms a container out of the openings. These containers (which have an ever shifting bottom) pass underneath a filling apparatus and are filled with a product. They then pass underneath a plunger which compresses the product therein. The plates then move off of the platform returning the openings to their original state, i.e. not having bottoms on them and not being containers. A second set of plungers then presses the compressed product from the openings where the product falls onto a conveyor and is carried away from the apparatus.

BRIEF DESCRIPTION OF THE DRAWING

The included drawings more fully illustrate our invention. In the drawings we have used FIG. 1 to illustrate a side view of the apparatus of our invention.

Figure 1:
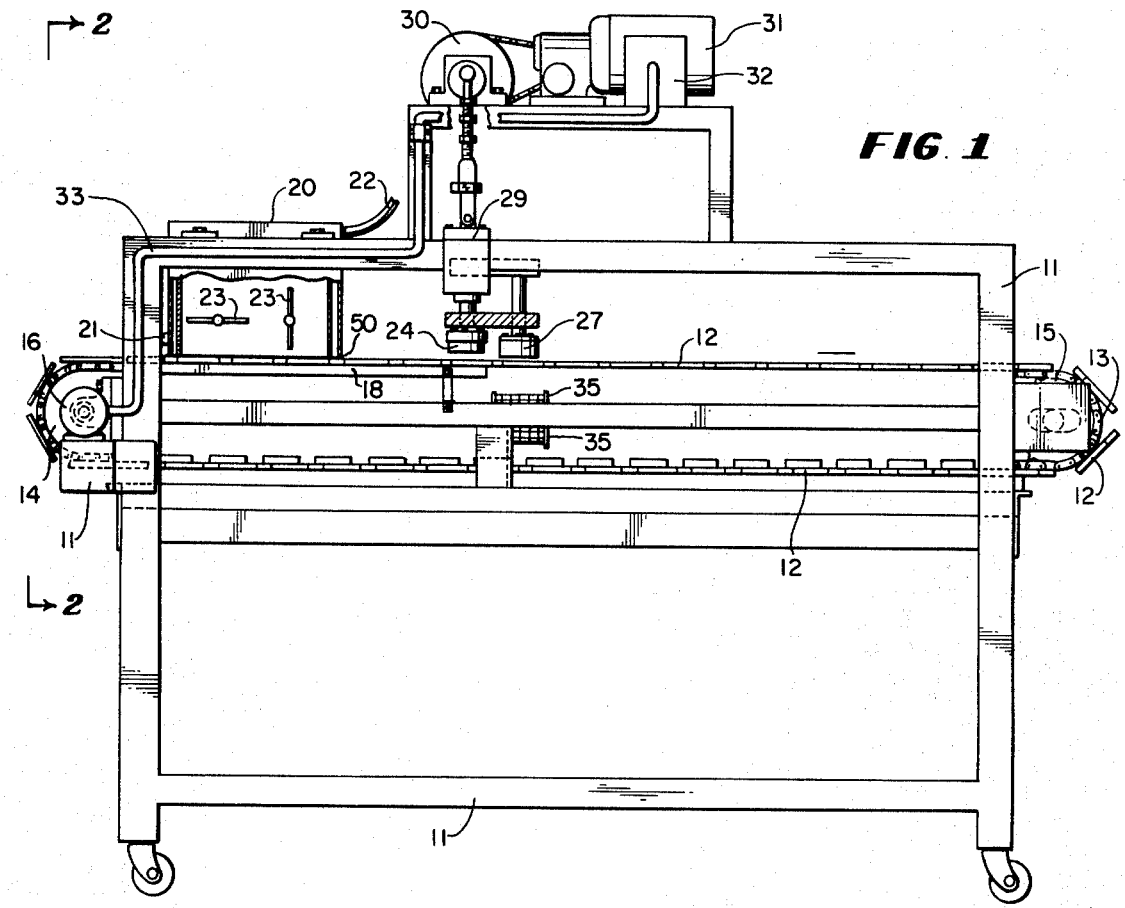
Figure 2:
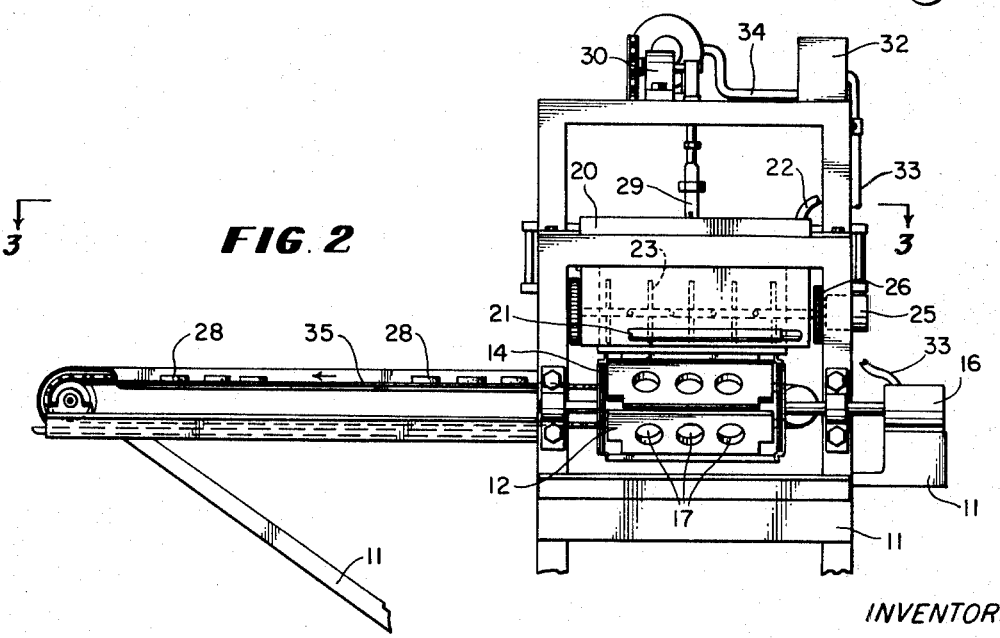
FIG. 2 is an end view of the apparatus of our invention taken along the line 2—2 of FIG. 1.
Figure 3:
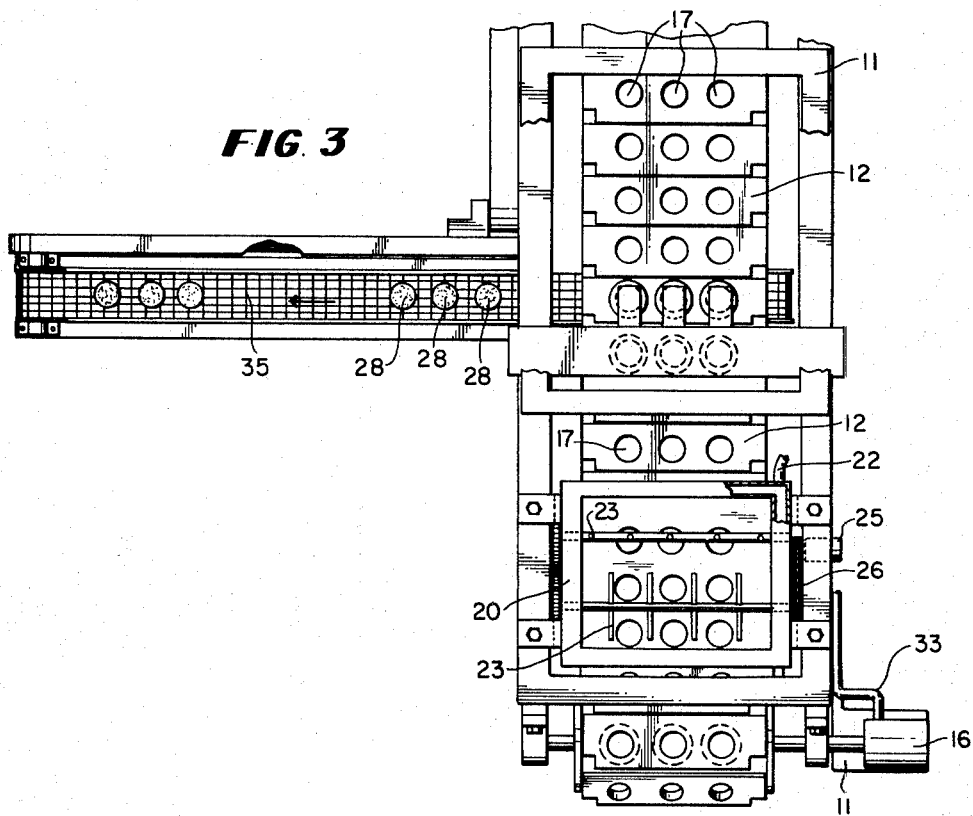
FIG. 3 is a cross-sectional view of the top of the apparatus of our invention taken along the line 3—3 of FIG. 2.
Figure 4:
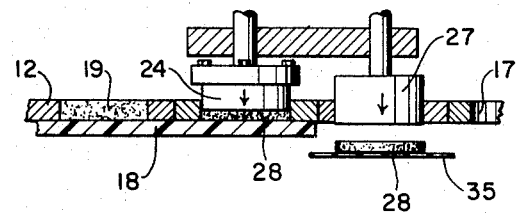
FIG. 4 is a partial view illustrating the compression and removal means of the apparatus of our invention.

In the drawings, we have used the numeral 11 to refer to the base of the apparatus. The base has a plurality of substantially equal sized plates 12 which are formed in a continuous endless conveyor system such as being attached to chain 13 which passes over sprockets 14 and 15 and which in turn is moved by a motor 16 or the like through the appropriate drive shafts and bearings. The equal sized plates have a plurality of openings 17 therein which are formed in such a manner as to create a sequence of openings or line of openings on the endless plate conveyor. As the equal sized plates are moved, they pass over a platform 18 which closes off the bottom of the openings thereby making them appear as open top containers. These openings in the form of open top containers then pass under a filling means which fills them level to the top with the desired material 19.

For purposes of illustration I have shown the filling means to be a container 20 which is open on both the top and the bottom and which has suitable means for cooling the material such as a water jacket with water inlet 21 and water outlet 22. The open container has a series of rotatable tines 23 rotated by motor 25 and gear system 26 which keep the mixture in motion and assures complete filling of the open top containers.

As the plates move underneath the fill mechanism, the forward edge 50 of the fill mechanism scrapes the mixture off even with the top of the open top containers, i.e., the plates with holes therein and then the mixture proceeds in the open top containers down the process line. A first series of plungers 24 move downward compressing the mixture in the container. The plates then move off of the platform 18 leaving the openings in their original condition. A second set of plungers 27 then press the compressed product 28 out of the openings.

For purposes of illustration we have shown the plungers to be connected to a rigid member 29 which is moved up and down by the gear system 30 which is in turn connected to the motor 31. The motors 31 and 14 are timed to move in the proper step-wise fashion by timing device 32 which is connected to each motor by the appropriate wiring device such as wires 33 and 34. As the compressed mixture is pressed out of the openings, it falls on a conveyor 35 which conveys the product away from the apparatus.

In operation, the plurality of equal sized plates are set in motion along the continuous path. They pass over the platform and under the filling device as described. A mixture of product with binder has been placed in the filling device; the tines in the device are rotated thereby causing the product to completely fill each of the open top containers. The plates then move from under the filling device being filled to the top with loose product. As the plates move down the process line, the plungers compress the product in the containers. The plates then move off the platform and a second set of plungers press the compressed product onto a conveyor which takes the product away from the apparatus to a packaging machine or the like.

DESCRIPTION OF THE PREFERRED EMBODIMENTS

The preferred embodiment of this invention is the one illustrated in the drawings and substantially described hereinabove.

Our invention includes a new and novel apparatus for producing a compressed ready-to-eat cereal biscuit.

Having fully described this new and unique invention, we claim:

1. An apparatus for producing a cereal biscuit or the like, said apparatus comprising: an endless conveyor, said endless conveyor comprising a plurality of substantially equal sized plates, said equal sized plates each having a plurality of juxtaposed openings extending from top to bottom through the equal sized plates, said juxtaposed openings forming a sequence of openings in the endless conveyor; a platform, said platform attached to said apparatus below a means for filling open top containers and said platform being underneath a portion of the endless conveyor and contacting the equal sized plates to form a plurality of open top containers; means for moving the endless conveyor over the platform; means for filling the open top containers with a mixture of cereal particles and binder; means for compressing a mixture of cereal particles and binder in the open top containers; means for removing a compressed mixture from an opening, said means for removing a compressed mixture from an opening being above said endless conveyor past the point at which the endless conveyor leaves the platform; and means for conveying compressed cereal biscuits away from the endless conveyor; and wherein the means for filling the open top containers with a mixture of cereal particles and binder comprises an open trough bounded on its lower side by the endless conveyor and having a plurality of movable tines therein; the means for compressing a mixture of cereal particles and binder in the open top containers comprises a plurality of plungers having a cross section substantially the same as that of the open top container and includes means for moving the plurality of plungers into the open top containers; and wherein the means for removing a compressed mixture from an opening comprises a plurality of plungers with for moving the plurality of plungers through the juxtaposed openings.

* * * * *